(No Model.)

J. P. ANDERSON & J. C. KELLER.
ICE CREAM FREEZER.

No. 326,827. Patented Sept. 22, 1885.

WITNESSES:
A. P. Grant,
N. F. Kirches

INVENTORS:
John P. Anderson,
Jacob C. Keller,
BY John A. Wiedersheim
ATTORNEY.

UNITED STATES PATENT OFFICE.

JOHN P. ANDERSON AND JACOB C. KELLER, OF PHILADELPHIA, PA.

ICE-CREAM FREEZER.

SPECIFICATION forming part of Letters Patent No. 326,827, dated September 22, 1885.

Application filed November 19, 1884. (No model.)

*To all whom it may concern:*

Be it known that we, JOHN P. ANDERSON and JACOB C. KELLER, both citizens of the United States, residing in the city and county of Philadelphia, State of Pennsylvania, have invented a new and useful Improvement in Ice-Cream Freezers, which improvement is fully set forth in the following specification and accompanying drawings, in which—

Figure 1:
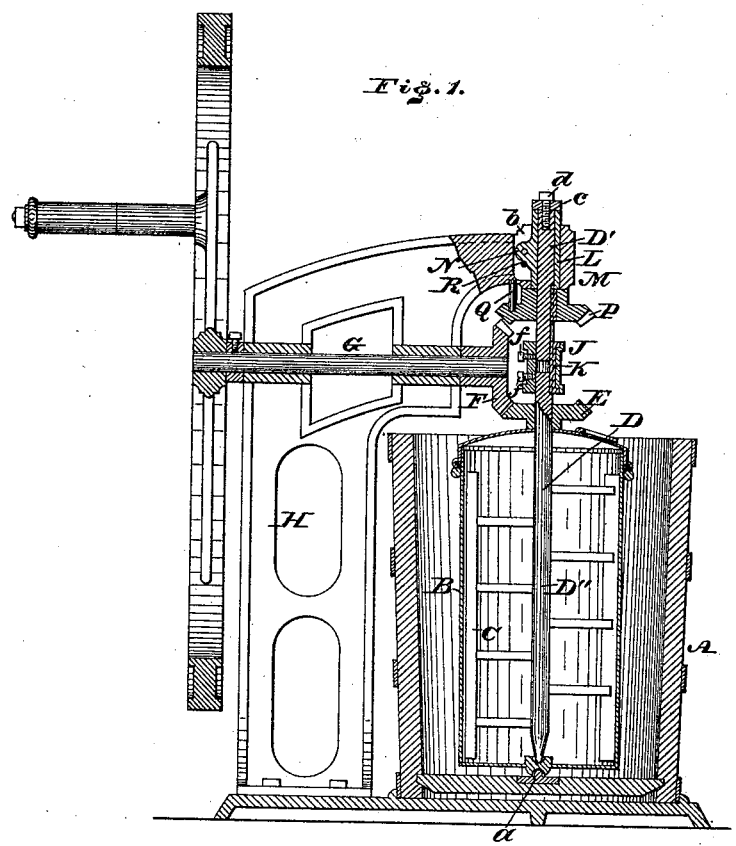
Figure 2:
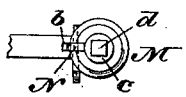

Figure 1 represents a central vertical section of an ice-cream freezer embodying our invention. Figure 2 represents a top or plan view of a portion thereof.

Similar letters of reference indicate corresponding parts in the two figures.

Our invention consists of an ice-cream freezer in which the can and the dasher or beater may be rotated independently of each other, and the dasher or beater either rotated or rendered inoperative, as desired, for the purpose of ice-cream making.

Referring to the drawings, A represents a tub, which is provided with a step, $a$, and B represents a rotatable can, which is placed within said tub and supported on the step $a$ thereof.

C represents the dasher or beater of the freezer, the shaft D of which is supported on a step within the can B, and passes freely through the top of the same and through a miter-wheel, E, which is secured to said top. Meshing with the wheel E is a miter-wheel, F, to which power is communicated in any suitable manner, said wheel F, in the present case, being secured to a shaft, G, whose bearings are on the frame H of the device.

The shaft D is divided, the two sections being connected by a coupling, J, within which is a key, K, which is fitted to said coupling and engages with grooves on the two sections of the shaft, so that said sections may move as one, and the upper section and the coupling be raised when desired.

The upper section, D', of the shaft D passes through a rising and falling sleeve, L, which is located in the boss M of the frame H, said boss having a recess, $b$, to receive a lug, N, which projects from the sleeve L, whereby the latter is prevented from rotation, it being seen that the section D' of the shaft D is rotated within the sleeve L, and held in position therein by means of a washer, $c$, which is secured to said section by a screw, $d$, and rests freely on the upper edge of the sleeve L.

Keyed or otherwise secured to the upper section, D', of the shaft is a miter-wheel, P, which, as is evident, rises and falls with said section and the sleeve L.

Depending from the upper arm of the frame H, adjacent to the boss M, is a pin, Q, which is so disposed that when the wheel P is raised it enters an opening in the latter and prevents rotation of the same.

In order to hold the wheel P, sleeve L, and section D in elevated position, we employ a pin, R, which is inserted in the boss M, so as to have the lug N bear against the same, as most clearly shown in Fig. 1.

It will be seen that when the parts are in position shown in Fig. 1 the wheel P is raised from the wheel F, consequently, when power is applied to the shaft, and as the wheels F E are engaged, rotary motion is imparted to the can B, the cream or mixture to be frozen being placed in the latter. The dasher or beater C, however, remains inactive or stationary, owing to the coupling J, section D' of the shaft D, and miter-wheel P being held by the pin Q, it being noticed that the can B and miter-wheel E rotate on the lower section of the shaft.

When it is desired to rotate the dasher or beater, the pin R is withdrawn from the boss M, whereby the wheel P is lowered clear of the pin Q and engaged by the wheel F, the sleeve L also lowering, and with it the shaft-section D', the lower end of the latter moving into the coupling J, and as the wheel P is rotated power is communicated to the section D', and owing to the key or feather connection of the coupling J with said section D', and also the lower section, D'', of the shaft D, the latter is rotated, the direction of rotation being the reverse of that of the can, the latter receiving its motion from the wheel F through the medium of the wheel E, as hereinbefore stated.

When the wheel P is in its engaged or lowermost position, it is prevented from rising by insertion of the pin R through the boss M into an opening in the lug N of the sleeve L. The wheel P may be again raised as desired, thus throwing the dasher or beater out of gear and rendering the same inoperative, and adapting the can to be rotated independent of the dasher or beater.

In order to relieve the key K of strain, we employ screws $f$, which are passed through the coupling J and tightened against the two sections D' D'' of the shaft D, either when the section D' is raised or lowered, the upper bolt being loosened during the operation of raising or lowering the upper section, D'.

When the can is to be removed, the coupling J is raised clear of the top of the lower section of the shaft D, the can with its connected parts then being readily withdrawn from the tub.

We do not claim, broadly, as new a clutch mechanism connecting the beater and can, neither do we claim a rising and falling beater, for such are old.

Having thus described our invention, what we claim as new, and desire to secure by Letters Patent, is—

1. A can, a beater, and a divided beater-shaft, in combination with the boss M, formed with a recess, $b$, a rising and falling sleeve, a rising and falling gear-wheel, the rising and falling section of said beater-shaft, a feathered coupling for the divided shaft, and gearing for the can, said sleeve having a lug which enters the recess $b$, substantially as and for the purpose set forth.

2. A can, a beater, gearing for the can, a divided beater-shaft, a sleeve, a boss, and a gear-wheel, in combination with the pins Q R, substantially as and for the purpose set forth.

3. A can, in combination with a divided beater-shaft, gearing connecting said can and beater-shaft, a frame, a boss attached to said frame, an adjustable sleeve working within said boss and secured to the upper portion of said beater-shaft, and a pin or lug attached to said frame and adapted to be inserted in a wheel secured to the said upper portion of the beater-shaft, substantially as and for the purpose set forth.

4. A can, in combination with a beater, a divided beater-shaft, a feather-coupling for said shaft having bolts adapted to bear against the sections of said shaft, a sleeve forming the bearings for the upper section of the divided shaft, and a gear-wheel connected with said section, substantially as and for the purpose set forth.

JOHN P. ANDERSON.
JACOB C. KELLER.

Witnesses:
JOHN A. WIEDERSHEIM,
A. P. GRANT.